United States Patent
Pemper et al.

(10) Patent No.: US 7,718,955 B2
(45) Date of Patent: May 18, 2010

(54) INELASTIC BACKGROUND CORRECTION FOR A PULSED-NEUTRON INSTRUMENT

(75) Inventors: Richard R. Pemper, Sugar Land, TX (US); Xiaogang Han, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 33 days.

(21) Appl. No.: 12/055,599

(22) Filed: Mar. 26, 2008

(65) Prior Publication Data

US 2009/0242746 A1     Oct. 1, 2009

(51) Int. Cl.
*G01V 5/10*     (2006.01)
(52) U.S. Cl. .................................. 250/269.6
(58) Field of Classification Search ............... 250/269.6
See application file for complete search history.

(56) References Cited

U.S. PATENT DOCUMENTS

| | | | |
|---|---|---|---|
| 3,932,747 A | | 1/1976 | Sherman |
| 4,232,220 A | * | 11/1980 | Hertzog .................. 250/269.8 |
| 4,390,783 A | | 6/1983 | Grau |
| RE33,176 E | * | 3/1990 | Cowherd et al. ............ 73/32 R |
| 5,374,823 A | | 12/1994 | Odom |
| 5,521,378 A | * | 5/1996 | Roscoe et al. ............ 250/269.6 |
| 6,289,283 B1 | | 9/2001 | Plasek |
| 6,389,367 B1 | | 5/2002 | Plasek |
| 2003/0178560 A1 | | 9/2003 | Odom et al. |
| 2006/0284066 A1 | | 12/2006 | Jacobson |

FOREIGN PATENT DOCUMENTS

EP     0640848 A1     3/1995

OTHER PUBLICATIONS

Pemper, et al. "A New Pulsed Neutron Sonde for Derivation of Formation Lithology and Mineralogy". SPE 102770. 2006 SPE Annual Technical Conference and Exhibition held in San Antonio, Texas, USA Sep. 24-27, 2006.
International Search Report for International Application No. PCT/US2009/038314. Mailed Nov. 24, 2009.
Written Opinion of the International Searching Authority for International Application No. PCT/US2009/038314. Mailed Nov. 24, 2009.

* cited by examiner

*Primary Examiner*—David P Porta
*Assistant Examiner*—Mindy Vu
(74) *Attorney, Agent, or Firm*—Cantor Colburn LLP

(57) ABSTRACT

A method for correcting data collected with a neutron emitting instrument, includes: obtaining characterization data for the instrument, the characterization data including inelastic background data of the instrument; and correcting the collected data according to the characterization data. A computer program product and an instrument are provided.

14 Claims, 6 Drawing Sheets

INELASTIC BACKGROUND CORRECTION FOR A PULSED-NEUTRON INSTRUMENT

BACKGROUND OF THE INVENTION

1. Field of the Invention

The invention disclosed herein relates to nuclear instrumentation and, in particular, to a neutron instrument useful for geologic evaluations.

2. Description of the Related Art

In the quest for petrochemical materials, such as oil and gas, many techniques are used to evaluate sub-surface materials. Typically, the sub-surface materials are evaluated by drilling boreholes into the earth and performing measurements with various instruments. Performing measurements is commonly referred to as "well logging."

Well logging is a technique used to take measurement properties of the sub-surface materials from the boreholes. In one embodiment, a "logging instrument" is lowered on the end of a wireline into a borehole. The logging instrument sends data via the wireline to the surface for recording. In some other embodiments, logging is performed while drilling, by use of instrumentation included within a drill string.

Measuring naturally occurring gamma radiation (or gamma rays) is one way to determine characteristics of the sub-surface materials. Accordingly, a gamma radiation detector may be used as a component of the logging instrument.

Gamma rays may be emitted from various sub-surface materials. For example, gamma rays may be emitted from the various formation layers and from borehole materials such as mud. In particular, the mud may contain natural emitters of gamma radiation, such as potassium. As the gamma radiation detector moves along the borehole, gamma rays from the various sources may enter the gamma radiation detector and be detected.

The gamma radiation detector may be used to estimate the energy of each gamma ray entering the detector. The gamma ray energy levels may be used to create gamma ray energy spectra. The gamma ray energy spectra reflect types and quantities of elements (referred to as elemental yields upon separation) in the formation layers and the borehole materials.

Other techniques may take advantage of measurements of gamma rays. For example, a neutron source may be used to activate the various sub-surface materials in the environment of and surrounding the borehole. Neutron activation results in additional gamma-ray emissions. Accordingly, neutron activation of sub-surface materials is useful for generating additional data descriptive of the sub-surface materials.

One instrument useful for performing neutron activation and activation analyses is the FLEX[SM] instrument, commercially available from Baker Hughes Incorporated, of Houston Tex. With the FLEX instrument, in general, a pulse of neutrons is used to activate nuclei of sub-surface materials. The neutrons interact with the nuclei, which may emit characteristic gamma rays, for the most part through one of two processes, neutron inelastic scattering, and neutron capture. The gamma rays from the neutron inelastic scattering occur during, or very soon after, the pulse of neutrons. The gamma rays resulting from the neutron capture events are typically delayed. The gamma rays may be detected with various gamma radiation detectors.

The gamma rays resulting from neutron inelastic interactions are used to create "inelastic gamma ray" energy spectra while delayed gamma rays emissions generally provide "capture gamma ray" energy spectra. Data from the two types of gamma ray energy spectra are used to deduce the elemental yields of the surrounding sub-surface materials.

Unfortunately, a significant number of background gamma rays are generated from the matter within the instrument itself. These background gamma rays interfere with the collection of data signals from the sub-surface materials. Although background gamma rays resulting from neutron capture can be reduced by applying a material, such as boron, to the outside of the housing of the instrument to prevent outside thermal neutron interacting with tool materials, no known material exists for the absorption of fast neutrons that interact with tool materials. Consequently, analysis of gamma ray spectra associated with neutron inelastic scattering becomes more difficult to analyze.

What are needed are techniques for correcting measurements of gamma radiation emitted from sub-surface materials, where the gamma radiation is produced by neutron inelastic scattering. In particular, the techniques are needed to compensate for gamma radiation resulting from interfering signals, such as gamma rays from within the survey instrument itself.

BRIEF SUMMARY OF THE INVENTION

Disclosed is method for correcting data collected with a neutron emitting instrument, that includes: obtaining characterization data for the instrument, the characterization data including inelastic background data of the instrument; and correcting the collected data according to the characterization data.

Also disclosed is a computer program product including machine readable instructions stored on machine readable media, the instructions for correcting data collected with a neutron emitting instrument, by implementing a method that includes: obtaining stored characterization data for the instrument, the characterization data including inelastic background data of the instrument; and correcting the collected data according to the characterization data.

Further disclosed is an instrument for evaluating subsurface materials, that includes: a neutron source in nuclear communication with the subsurface materials; at least one gamma detector in nuclear communication with the subsurface materials; a data output from the at least one gamma detector for providing collected data to a processor; the processor equipped with access to machine readable instructions stored on machine readable media, the instructions for correcting the collected data by obtaining stored characterization data for the instrument, the characterization data including inelastic background data of the instrument; and correcting the collected data according to the characterization data; and an output to provide the corrected data to a user.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for discounting data associated with neutron activation of components of a downhole instrument used for performing neutron activation of sub-surface materials. The accounting provides for effective removal of an interfering background radiation signal from a gross data signal and results in a corrected data signal. As an example, the techniques provide for discounting the interfering background radiation signal resulting from activation of components within the instrument from the gross data signal measured by a gamma detector. The discounting results in a corrected data signal descriptive of the properties of the sub-surface materials and is relatively free of data from the interfering background radiation signal.

Figure 1:
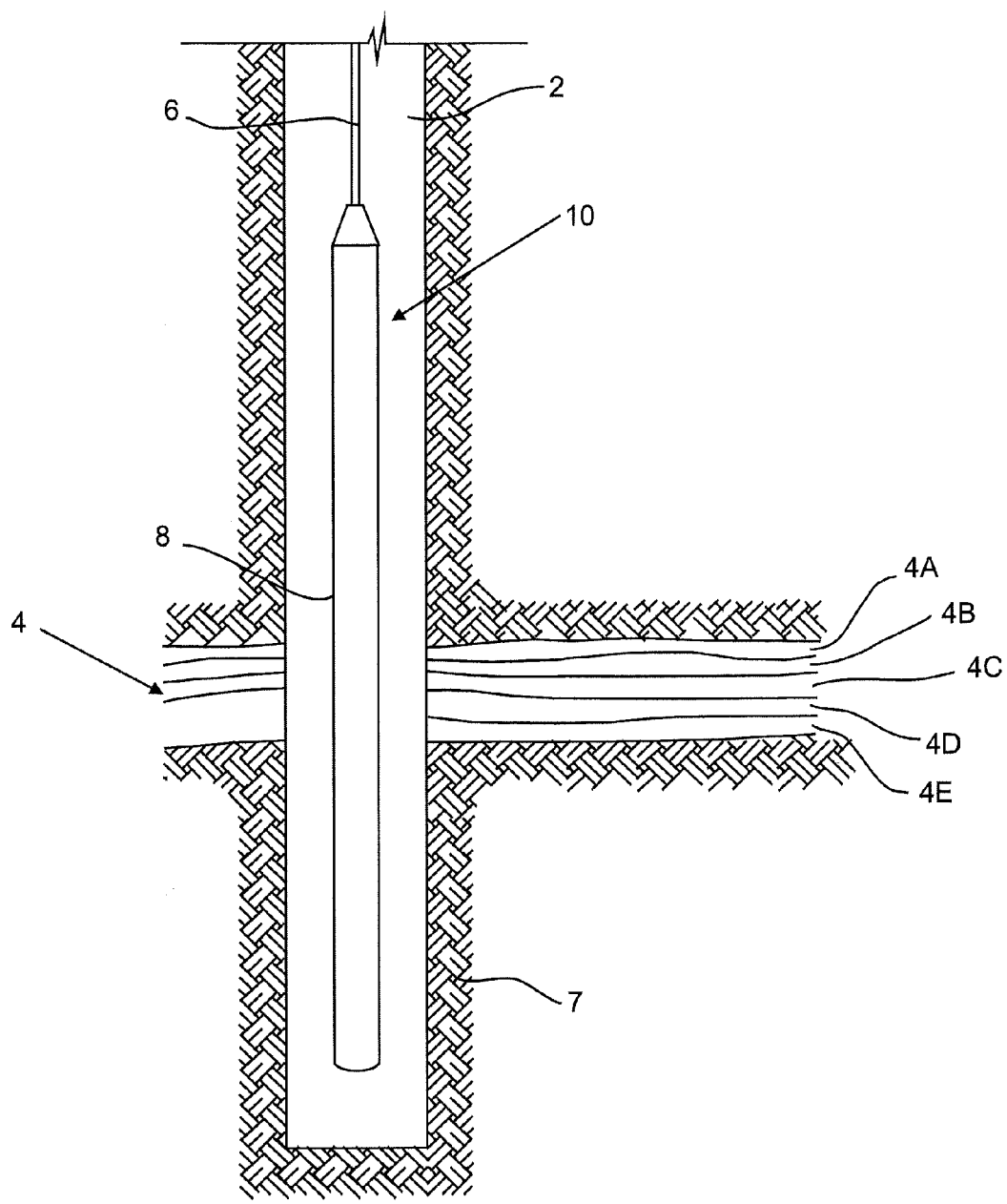
FIG. 1 illustrates an exemplary embodiment of a logging instrument in a borehole penetrating the earth.

Referring now to FIG. 1, an exemplary well logging instrument 10 is shown disposed in a borehole 2. The borehole 2 is drilled through earth 7 and penetrates formations 4, which include various formation layers 4A-4E. The logging instrument 10 may be lowered into and withdrawn from the borehole 2 by use of an armored electrical cable 6 or similar conveyance as is known in the art.

In typical embodiments, the borehole 2 includes materials such as would be found in oil exploration, including a mixture of liquids such as water, drilling fluid, mud, oil, gases, and formation fluids as may be indigenous to the surroundings. One skilled in the art will recognize that the various geologic features as may be encountered in a subsurface environment may be referred to as "formations," and that the array of materials down the borehole (i.e., downhole) may be referred to as "sub-surface materials." That is, the formations are formed of sub-surface materials. Accordingly, as used herein, it should be considered that while the term "formation" generally refers to geologic formations of interest, and "sub-surface material," includes any materials of interest such as fluids, gases, liquids, and the like, and may include other materials such as drilling mud.

The teachings herein provide for making accurate measurements of properties of the sub-surface materials. In particular, certain measurements are corrected to remove gamma radiation emitted from the instrument 10. Before the logging instrument 10 and techniques are discussed in detail, certain definitions are provided.

As used herein, the term "gamma radiation detector" relates to instruments that measure the gamma radiation entering the instrument. For example, the gamma radiation detector may use a scintillator material that interacts with gamma radiation and produces photons which are detected by a photomultiplier tube coupled to electronics. Exemplary gamma radiation detectors include, without limitation, sodium iodide (NaI), cesium iodide (CsI), bismuth germinate (BGO), thallium iodide (TlI), and other organic crystals, inorganic crystals, plastics and combinations thereof.

Also as used herein, the term "characterization data" generally makes reference to a radiological profile (e.g., a gamma emission profile) of the instrument. More specifically, the instrument will exhibit certain radiological characteristics. In various embodiments, these characteristics are a result of irradiation with neutrons, and activation of components of the instrument which may ultimately result in emission of gamma rays from the components. Non-limiting embodiments for the generation of characterization data are provided herein.

The term "detector geometry" relates to a configuration of the gamma radiation detector. The detector geometry may include a size and a shape of the scintillator material and photomultiplier. The term "placement geometry" relates to placement of a gamma radiation detector within the logging instrument 10 or in relation to the surrounding volume. The term "logging while drilling" (LWD) relates to measuring parameters from the borehole 2 while drilling is taking place. The term "sonde" relates to a section of the well logging tool 10 that contains measurement sensors as opposed to the section that contains electronics and power supplies.

The terms "neutron capture" or "capture" make reference to a kind of nuclear interaction in which a neutron collides with an atomic nucleus and is merged into the nucleus forming a heavier nucleus. As a result, the heavier nucleus enters into a higher energy state. At least some of the energy of the neutron capture interaction is usually lost in the emission of gamma rays.

The terms "inelastic collision," "neutron inelastic scattering" or "inelastic" make reference to a collision in which an incoming neutron interacts with a target nucleus and causes the nucleus to become excited, thereby releasing a gamma ray before returning to the ground state. In inelastic collisions, the incoming neutron transfers some of its energy to the target nucleus before that energy is released in the form of a gamma ray.

Further, it should be noted that a variety of neutron emitting sources are known. Examples include americium-beryllium (AmBe) sources, plutonium-beryllium (PuBe) sources, californium sources (e.g., Cf-242) and others. Therefore, while the teachings herein are generally directed to a pulsed neutron source, it should be recognized that the term "neutron emitting" may be considered with reference to the variety of sources now available or subsequently devised.

Figure 2:
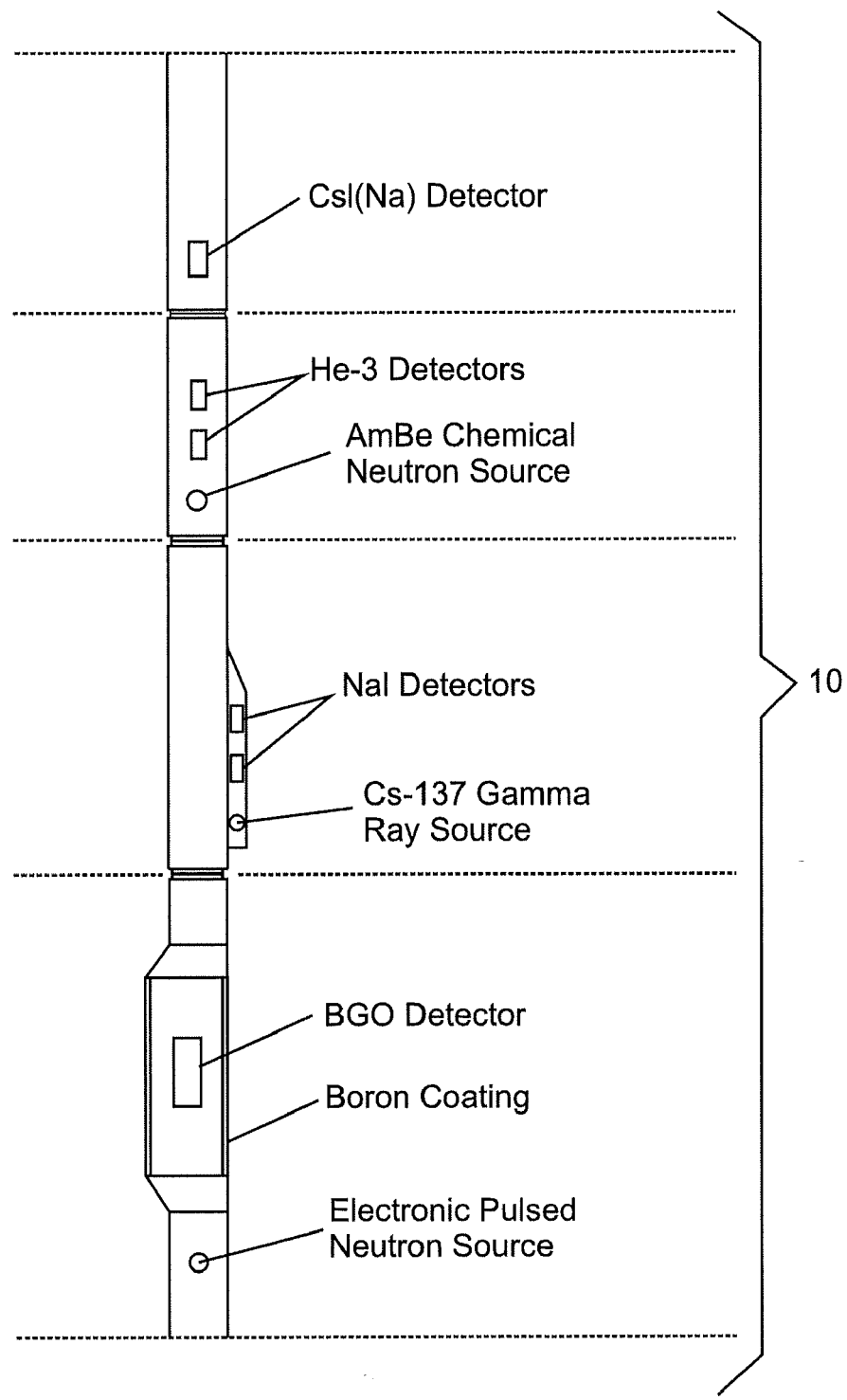
FIG. 2 depicts aspects of another exemplary embodiment of the logging instrument.

Referring now to FIG. 2, there is shown an exemplary logging instrument that uses pulsed neutron emissions. In this non-limiting example, the instrument 10 makes use of a BGO scintillation detector, high speed downhole electronics, and an accelerator-based neutron source capable of pulsing at high frequencies. This instrumentation is packaged inside a high-strength titanium housing. Neutron and gamma ray shielding materials are strategically placed inside the instrument 10 to prevent the detection of gamma rays from unfavorable directions. A recessed, abrasion-resistant boron-carbide (B4C) shielding is placed on the housing over the detector section, reducing the capture gamma ray background.

While operating in the subsurface borehole environment, the electronically timed pulsed-neutron source emits neutrons having an energy of about 14 MeV. The neutrons are emitted into the ambient formation(s) 4 and the subsurface materials. In about 1-2 μsecs, these fast neutrons promptly interact with the nuclei of the surrounding sub-surface materials and scatter elastically as well as inelastically, ultimately losing their energy. Some of the nuclei of the atoms with which the neutrons interact become energetically excited during the inelastic scattering process, after which they return to the ground state by emitting one or more gamma rays with energies characteristic of the parent atom. This process results in the measured inelastic spectrum of gamma ray energies, and can only take place if the energy of the incident neutron is sufficient to raise the nucleus of the parent atom to one or more of its excited energy levels, or bound states.

The neutrons continue their slowing down process until they reach thermal equilibrium with the surrounding medium. Thermal neutrons typically possess energy of about 0.025 eV, and may remain in a diffusion process for up to about 800 μsec before being absorbed by the nuclei of the surrounding atoms. This absorption results in new isotopes of the same elements. Upon absorption, the nuclei of these isotopes usually de-excite through delayed emission of one or more gamma rays. As in the case of the inelastic spectrum, these energies carry the fingerprint of the parent atom and allow each element (i.e., isotope) to be uniquely identified. This absorption process leads to the acquisition of the capture spectrum. The capture spectra and the inelastic spectra for each individual element are different.

Figure 3:
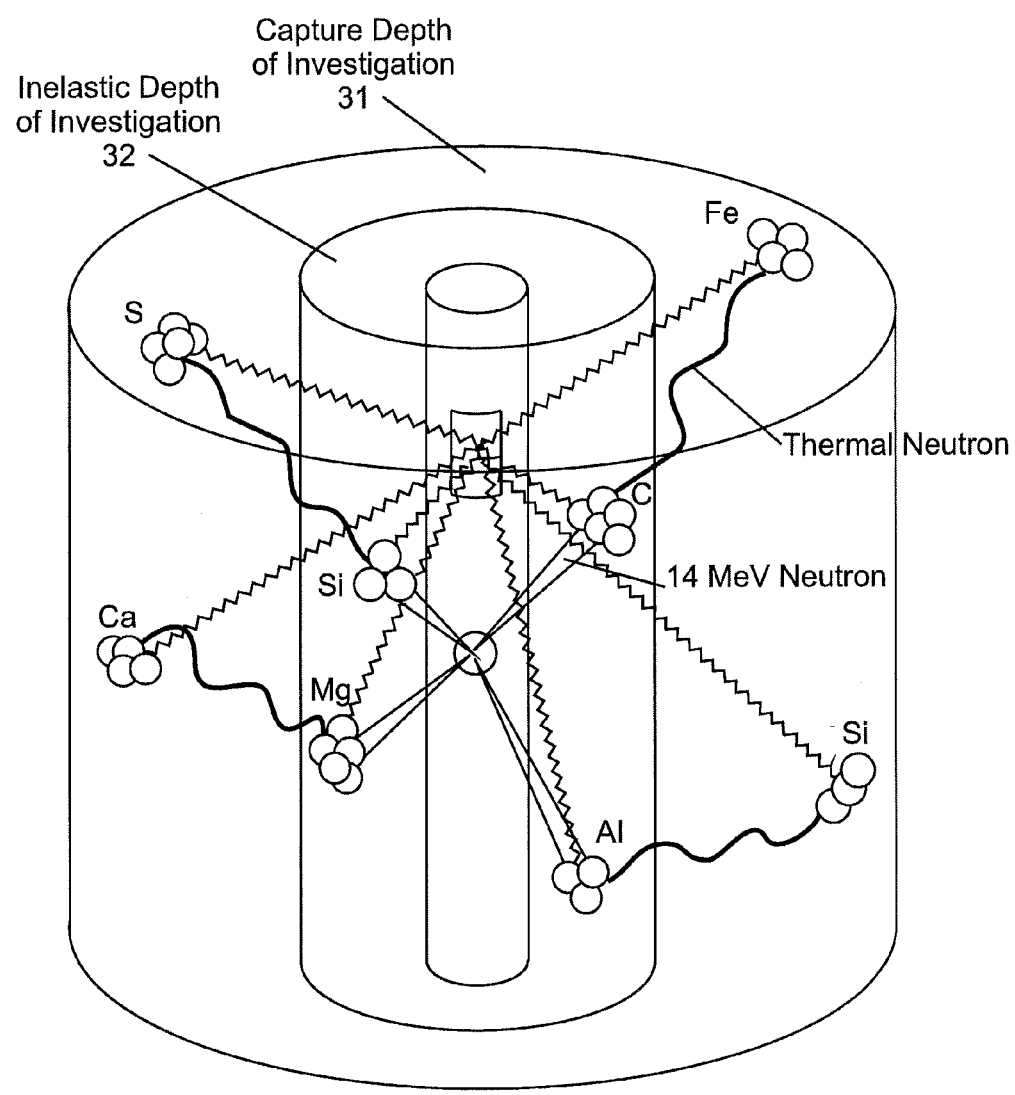
FIG. 3 depicts exemplary survey volumes for a pulsed neutron instrument.

Refer now to FIG. 3. In this exemplary graphic, gamma rays that interact within the detector are produced, generally within two concentric volumes surrounding the instrument 10. That is, FIG. 3 depicts a capture depth of investigation 31, and an inelastic depth of investigation 32 that is generally shorter than the capture depth of investigation 31. The detector(s) of the instrument 10 identify the gamma rays so that information about the elemental content of the surrounding sub-surface materials can be estimated. Unfortunately, a significant number of background gamma rays are generated from the matter within the instrument 10 itself, and these interfere with the desired signal from the sub-surface materials. This is true for gamma ray energy spectra induced by both neutron capture interactions and inelastic scattering interactions.

Figure 4:
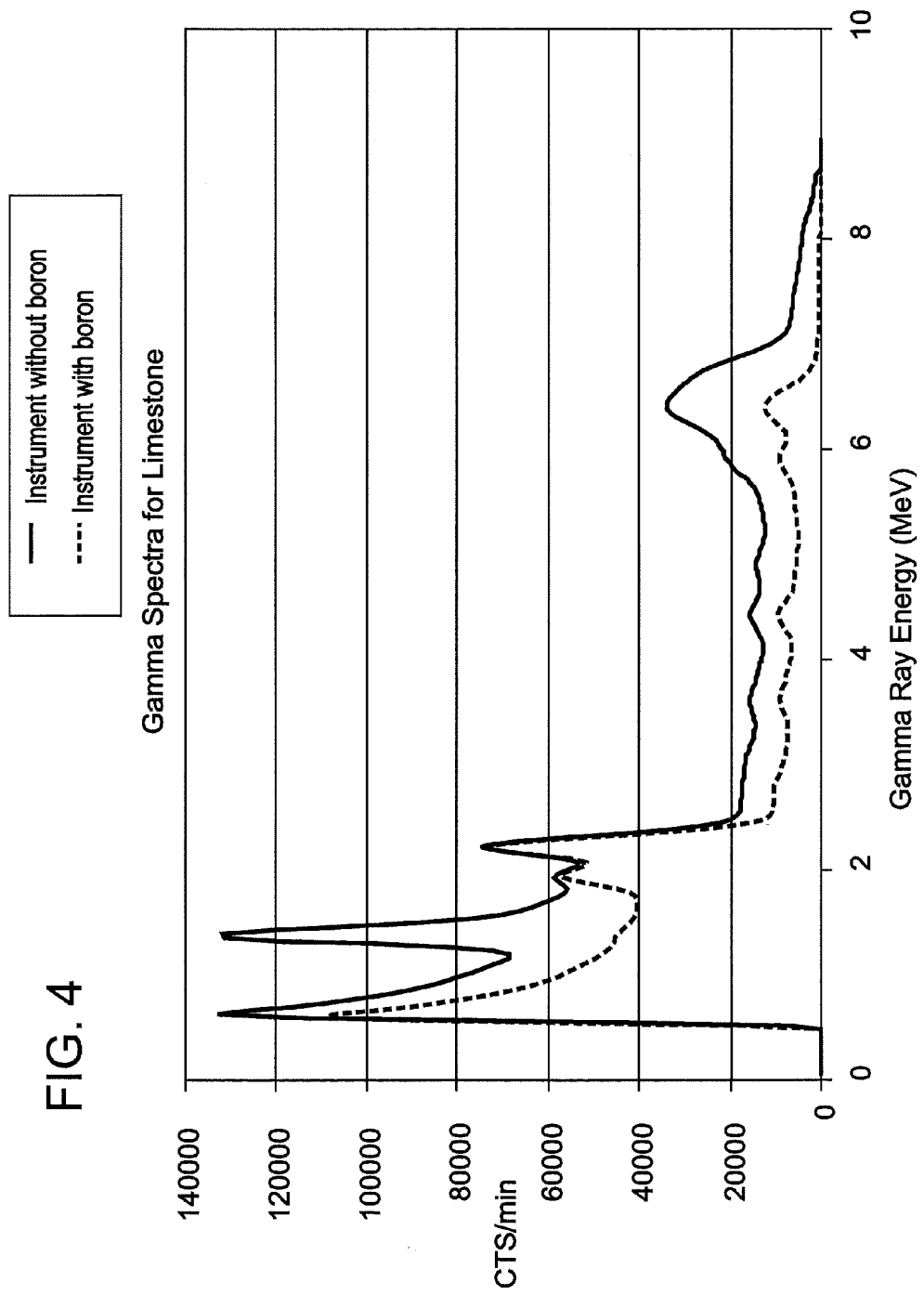
FIG. 4 depicts capture spectra for a volume of limestone. In combination, the spectra show the effect of placing boron on the instrument housing.
Figure 5:
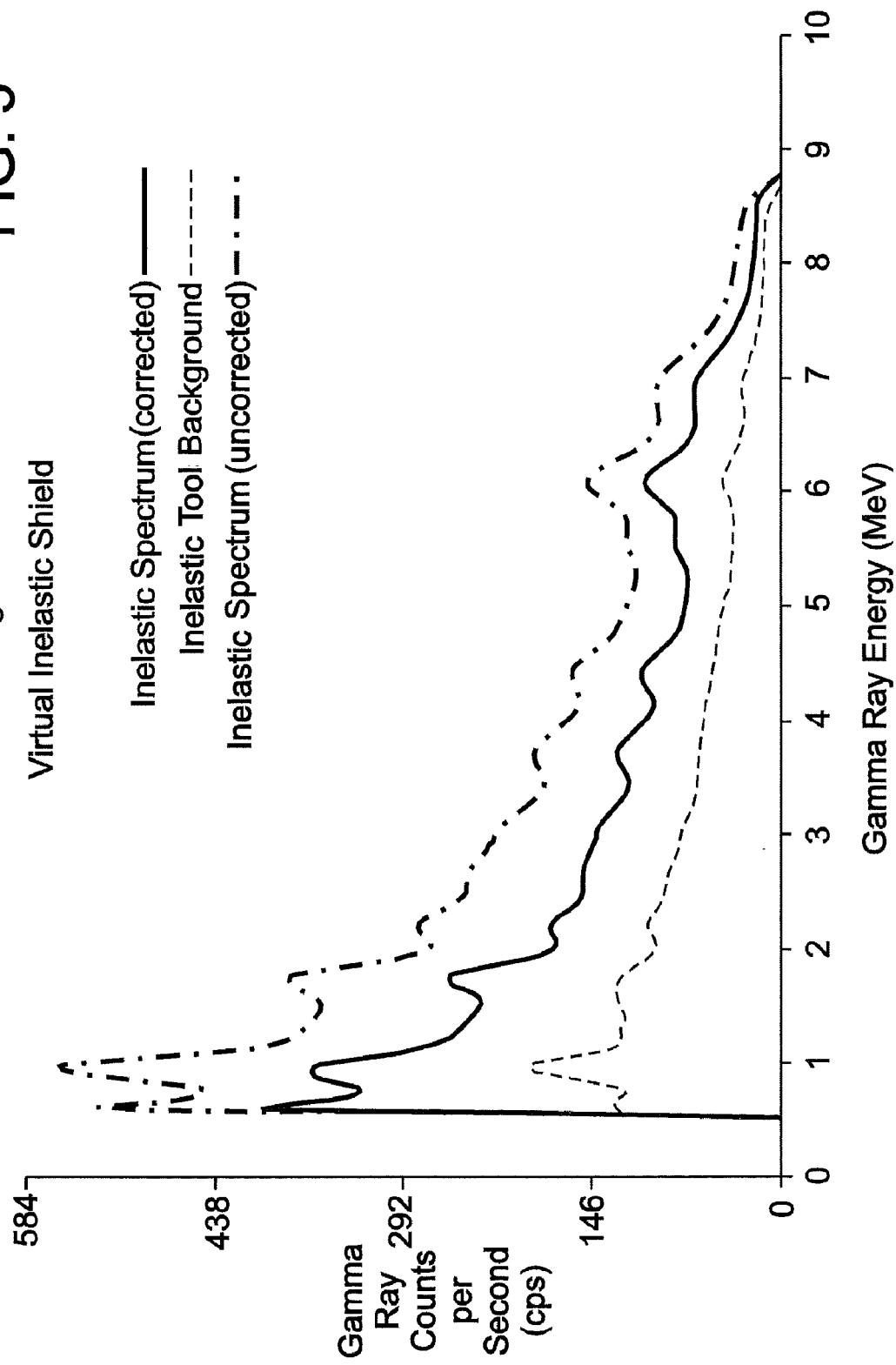
FIG. 5 depicts capture spectra resulting from removal of inelastic background gamma rays from the instrument.

Background radiation signals resulting from neutron capture can be substantially reduced by applying a material with a high cross section for neutron absorption, such as boron, to the housing of the instrument 10. Effects of the use of a boron shield are shown in FIG. 4, where comparative spectra resulting from capture interactions from an instrument with a boron coating and an instrument without a boron coating are shown. The spectra were collected from measurements within a formation 4 that was predominantly formed of limestone. Note that in this diagram, a background signal appears in the vicinity of about 1.4 MeV and about 6.5 MeV. This signal is, to a great degree, removed when a coating of boron is applied to the housing of the instrument 10. The energy peak associated with calcium (one of the primary components of limestone, exhibiting a gamma emission of 6.42 MeV) is more easily observed with the background signal removed. This removal is due to the large neutron capture cross section of boron, which is applied to the instrument 10 in a manner that provides for neutron absorption before the neutrons enter the external housing of the instrument 10.

Whereas materials with high capture cross sections such as boron can be used to absorb low energy thermal neutrons (>>0.025 MeV), no known material exists for the absorption of 14 MeV high energy neutrons (also referred to as "fast neutrons"). The fast neutrons are emitted from the pulsed neutron source at speeds of 115 million mph, or about 17% of the speed of light. Since the fast neutrons originate from the pulsed neutron source which is embedded inside the tool, a significant fraction of these neutrons interact with the materials inside the instrument before reaching the sub-surface materials. Such interactions produce an interfering background signal of background inelastic gamma rays associated with elements inside the tool.

A method is described herein whereby the interfering background signal is removed from the gross data signal to produce a corrected data signal. Application of the method results in what may be referred to as a "virtual inelastic shield."

A similar correction can be applied to the capture spectrum, although the effect is significantly smaller than the correction needed for the inelastic spectrum. The correction to the capture spectrum results from capture gamma rays originating from materials inside the instrument. Such capture gamma rays result from thermal neutrons that are not absorbed by the boron coating on the outside of the housing. This minor correction to the capture spectrum is referred to as the "virtual capture shield."

In general, the techniques call for measuring the background inelastic spectrum in the absence of any other materials. This can easily be performed, for example, by measuring the background inelastic spectrum when the instrument is hanging in air. Once the background inelastic spectrum has been measured, the instrument may be characterized. In the characterization, various other tasks may be performed to refine the measurement. In operation, the inelastic background spectrum of the instrument that is measured and refined as desired, is generally subtracted from gross data signals to provide the corrected data signal.

Figure 6:
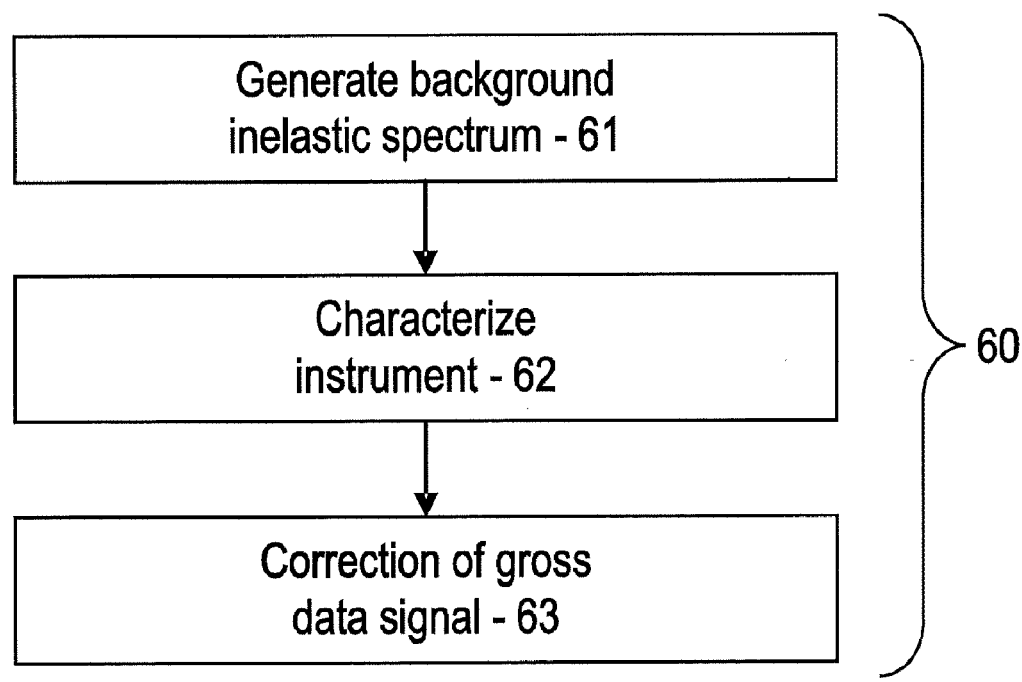
FIG. 6 depicts an exemplary method for estimating and removing an interfering background signal from the instrument.

Referring now to FIG. 6, there is shown an exemplary method for providing corrected data 60. In the method for providing corrected data 60, the background inelastic spectrum is generated 61. To accomplish this task, the instrument 10 is suspended in air, a vacuum or some other material or manner, such that a measurement with the instrument 10 is predominantly that of the background inelastic spectrum of the instrument. The inelastic gamma rays come from interactions with the instrument 10, since the air outside the instrument does not have enough density for any significant additional inelastic signal to be generated.

As another stage of the method for providing corrected data 60, characterizing the instrument 62 is performed. This stage considers acquiring the background inelastic spectrum in a manner suited for subsequent use. For example, multiple measurements may be performed. An appropriate collection time may be at least one of estimated and used. The collection results may be at least one of combined and tested for selection of a best spectrum. For example, statistical tests may be used to determine characteristics of spectra or for other purposes. Such tests may include at least one of evaluation of resolution, count rate and gain.

In a subsequent stage of the method for providing corrected data 60, correcting the gross data signal 63 is performed. In one embodiment, correcting the gross data signal 63 calls for subtraction of the background inelastic spectrum from the gross data signal. In another embodiment, correcting the gross data signal 63 calls for performing a statistical fit or other correlation of the gross data signal with the background inelastic spectrum.

In other embodiments, certain tests or quality measures may be performed as well. For example, at least one nuclide from the background inelastic spectrum of the instrument may be used to correlate the background inelastic spectrum of the instrument with the gross data signal. More specifically, a nuclide may be used as a correlation key or marker to ensure proper quality. For example, a particular isotope may be used to check the gain setting of the instrument (whether the particular isotope is a part of the instrument or incorporated for use as the correlation key).

The method for providing corrected data 60 may be completed as an initial characterization of the instrument 10, periodically, prior to use, or at any interval deemed appropriate by a user. In effect, the method for providing corrected data 60 provides for characterizing the inelastic background that originates from within the instrument.

In one embodiment, the instrument is characterized in an instrument calibration device, such as a Neutron Calibration Barrel. A Neutron Calibration Barrel is a cylindrical tank filled with a fluid mixture that contains a large concentric hole through the center, where the tool can be placed and calibrated. In this example, the inelastic spectrum generated in the barrel by the instrument is correlated to the number of background inelastic gamma rays for the specific motor voltage applied to the neutron source. Thus, in this embodiment, it is not necessary that the instrument be run in the air. However, the instrument should be calibrated, which occurs when it is placed into the Neutron Calibration Barrel.

Results of the method for providing corrected data 60 may be embodied in electronics, such as at least one of a storage, a memory and a processor. The embodiment, which may be referred to as the "virtual inelastic shield," may include machine executable instructions stored on machine executable media, where the instructions provide for at least one of the generating, characterizing and correcting.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for correcting data collected with a neutron emitting instrument, the method comprising:
    obtaining characterization data for the instrument, the characterization data comprising inelastic background data of the instrument; and
    correcting the collected data according to the characterization data the correcting including subtracting the inelastic background data of the instrument from the collected data.

2. The method as in claim 1, wherein the inelastic background data comprises a spectrum.

3. The method as in claim 1, further comprising: estimating at least one inelastic background spectrum of the instrument.

4. The method as in claim 3, wherein the estimating comprises evaluating a plurality of the inelastic background spectrum of the instrument.

5. The method as in claim 1, wherein the obtaining comprises: estimating contribution to the collected data from capture gamma rays originating from materials inside of the instrument.

6. The method as in claim 1, further comprising: collecting the inelastic background data in free air.

7. The method as in claim 1, wherein the obtaining comprises estimating at least one of a collection time, a resolution, a gain and a count rate.

8. A computer program product comprising machine readable instructions stored on machine readable media, the instructions for correcting data collected with a neutron emitting instrument, by implementing a method comprising:
    obtaining stored characterization data for the instrument, the characterization data comprising inelastic background data of the instrument; and
    correcting the collected data according to the characterization data the correcting including subtracting the inelastic background data of the instrument from the collected data.

9. The computer program product as in claim 8, further comprising:
    estimating the inelastic background data of the instrument.

10. The computer program product as in claim 9, wherein the estimating comprises evaluating at least one inelastic background spectrum of the instrument.

11. The computer program product as in claim 9, wherein the estimating comprises performing at least one statistical test.

12. The computer program product as in claim 8, wherein obtaining comprises estimating at least one of a collection time, a resolution, a gain and a count rate.

13. The computer program product as in claim 8, wherein the characterization data comprises an estimate of a contribution by capture gamma rays originating from materials inside of the instrument.

14. A instrument for evaluating subsurface materials, the instrument comprising:
    a neutron source in nuclear communication with the subsurface materials;
    at least one gamma detector in nuclear communication with the subsurface materials;
    a data output from the at least one gamma detector for providing collected data to a processor;
    the processor equipped with access to machine readable instructions stored on machine readable media, the instructions for correcting the collected data by obtaining stored characterization data for the instrument, the characterization data comprising inelastic background data of the instrument; and correcting the collected data according to the characterization data, the correcting including subtracting the inelastic background data of the instrument from the collected data; and
    an output to provide the corrected data to a user.

* * * * *